May 5, 1931.  H. R. GIBBONS  1,803,966
ANTIFRICTION BEARING
Filed April 13, 1927
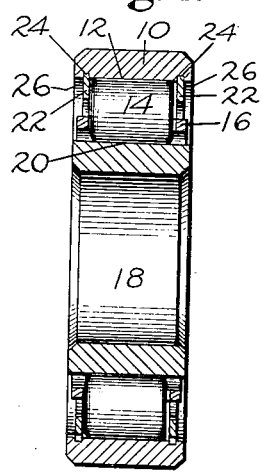
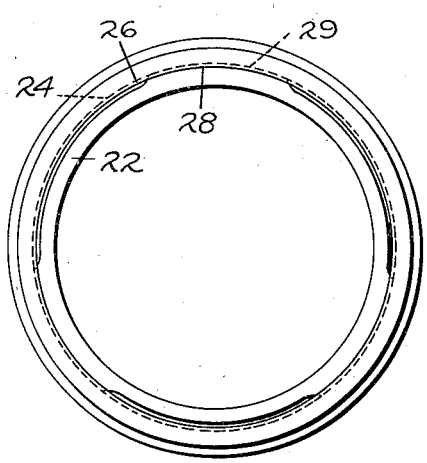
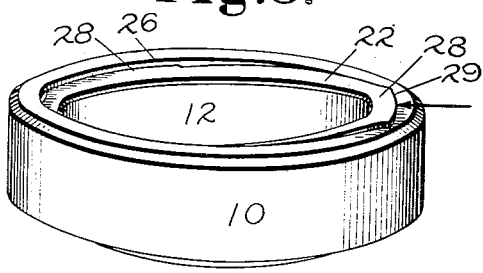
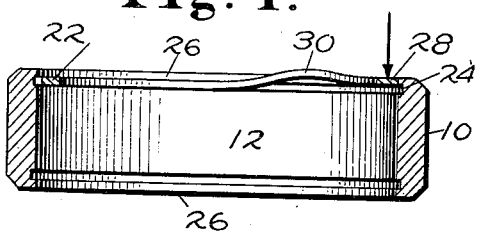
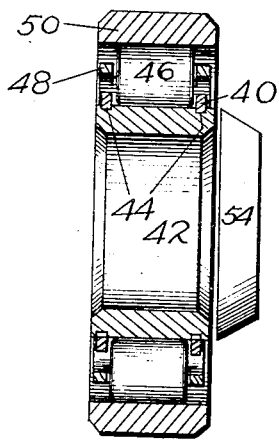
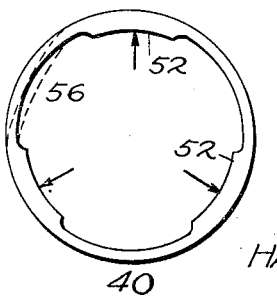
INVENTOR:
HAROLD R. GIBBONS,
BY
HIS ATTORNEY.

Patented May 5, 1931

1,803,966

UNITED STATES PATENT OFFICE

HAROLD R. GIBBONS, OF CHATHAM, NEW JERSEY, ASSIGNOR TO GENERAL MOTORS CORPORATION, OF DETROIT, MICHIGAN, A CORPORATION OF DELAWARE

ANTIFRICTION BEARING

Application filed April 13, 1927. Serial No. 183,338.

This invention relates to antifriction bearings and comprises all the features of novelty herein disclosed.

An object of the invention is to provide an improved retaining means to hold rolling elements in one of the races of a bearing.

To these ends, and to improve generally upon devices of this character, the invention also consists in the various matters herein after disclosed.

In the drawings Figure 1 is a transverse section of the assembled bearing.

Figure 2 is a side view of the outer race ring with the retaining means applied.

Figure 3 is a perspective view and Figure 4 is a transverse section of the outer race ring showing the method of applying the retainer rings.

Figure 5 is a transverse section of a modified bearing.

Figure 6 is a side view of the retaining means for said bearing.

The numeral 10 indicates an outer race ring having a cylindrical raceway 12 for a circular series of short cylindrical rollers 14 spaced by a band 16. The band has rectangular openings smaller than the rollers and is arranged inside the circle through the roller centers, thereby holding the rollers and the outer race ring assembled. A removable inner race ring 18, having a plain cylindrical raceway 20, is arranged inside the circle of rollers.

To retain the rollers against endwise movement and guide them during rotation, retaining rings 22 are secured in shallow grooves 24 of the race ring 10 to engage the flat circular ends of the rollers. Outside the grooves 24 are lands or side walls 26 which lie in the same cylinder as the raceway 12. The rings 22 normally have a slight clearance with the ends of the rollers but their flat inner faces will resist any induced end thrust of the rollers and guide them. The rings 22 are assembled in the grooves in a manner not to permanently distort these flat inner faces and so preserving a continuous and uniform guiding surface over which the wear is evenly distributed. Each ring 22 is provided with a series of radial tongues or projections 28 preferably three. The outer edges 29 of the tongues lie in an arc of a diameter to fit the bottom of the groove and the outer edges of the remaining portions of the ring lie in an arc of a diameter to clear the land 26. These outer edges are clear of the sides of the groove and guide the rollers at an area removed from the peripheries of the rollers. Two of the tongues lie wholly on one side of a diameter of the retaining ring and are spaced widely apart by an easily deformable arcuate portion. Another tongue lies on the other side of the diameter opposite the space between the first tongues and is widely spaced from the first tongues by easily deformable arcuate portions. In assembling the ring, one (or more) of the tongues 28 is laid in the groove 24 and pressure is then applied radially against the remaining tongue or tongues in the direction of the arrow in Figure 3. This causes the weaker portions of the ring to bulge outwardly as indicated at 30 in Figure 4 and, by exerting pressure in the direction of the arrow in Figure 4, the remaining tongue 28 will be carried across the land 26 until it snaps into the groove. The land 26 is utilized to hold the ring temporarily in its deformed condition as the remaining tongue is moved laterally into line with the groove. The ring then immediately regains its original shape and lies flat. Assembly is purely by elastic deformation, facilitated by the long narrow arcuate portions connecting the tongues, there being no permanent intermediate shape to which the ring tends to return. The tongues project radially a distance which is small in relation to the length of the deformable arcuate portions so that assembly without any permanent distortion is facilitated. It is not necessary to have any shoulders and except for the grooves, the inner race ring is straight across, thereby facilitating manufacture.

Figures 5 and 6 illustrate retaining means 40 for an inner race ring 42 having grooves 44 and rollers 46 spaced by a band 48 outside the circle through the roller centers. There is a removable outer race ring 50. The retaining means 40 is provided with a series of inner tongues or projections 52, preferably three. In assembling the ring 40 with the inner race, a conical member 54 is convenient to use. By pressing the ring 40 laterally against the conical surface, a radial pressure is also produced in the direction of the arrows in Figure 6. This stretches the ring, deformation taking place in the region 56 where the ring is weakest and allowing the ring to be crowded over into the groove. If desired, one or more of the tongues can be first inserted in the groove and lateral pressure applied to the remaining tongue or tongues to force the latter along the conical surface into line with the groove.

I claim:

1. In an antifriction bearing, a race ring having a cylindrical raceway and a continuous cylindrical land, the land and the raceway lying in the surface of the same cylinder whose continuity is interrupted by a groove, a series of rollers running on the raceway, and a continuous flat-sided retaining ring having widely spaced projecting tongues in the groove, the ends of the tongues being arcuate and lying in a circle of the same diameter as the bottom of the groove to fit against it, the ring presenting a flat guiding surface to the ends of the rollers and being applicable to the race ring purely by elastic deformation whereby the guiding surface has inherent tendency to retain its flat form; substantially as described.

2. In an antifriction bearing, in combination, a race ring having a raceway and a groove at the end of the raceway, and a guiding and retaining element held in the groove and comprising a continuous flat sided ring having a pair of projecting tongues located wholly on one side of a diameter of the ring and spaced apart, and a single tongue projecting radially from the ring on the other side of the diameter opposite the space between the first two tongues, said single tongue being widely spaced from the first two tongues by long narrow and easily deformable arcuate portions; substantially as described.

3. In an antifriction bearing, a race ring having a raceway, the race ring having a groove at the end of the raceway with a continuous land beyond the groove, a continuous flat retaining ring having a pair of radially projecting tongues, the tongues being spaced apart but located on one side of a diameter of the ring, and a single tongue extending radially from the ring on the other side of the diameter and spaced from the first tongues by long narrow arcuate portions, the amount of projection of the single tongue being small in relation to the length of the arcuate portions; substantially as described.

4. In an antifriction bearing, a race ring having a cylindrical raceway, the race ring having a groove at the end of the raceway with a continuous land beyond the groove, the land having the same diameter as the raceway, a continuous flat retaining ring having a radially projecting tongue located on one side of a diameter of the ring, and a tongue extending radially from the ring on the other side of the diameter and projecting an amount which prevents removal of the tongue from the groove when the first tongue is in the groove, the amount of projection being small and the part of the ring connecting the tongues being long and narrow for easy deformation; substantially as described.

5. In an antifriction bearing, a race ring having a cylindrical raceway, the race ring having a groove at the end of the raceway with a continuous land beyond the groove, the land having the same diameter as the raceway, a continuous flat retaining and guiding ring having a radially projecting tongue located on one side of a diameter of the ring, and a tongue extending radially from the ring on the other side of the diameter and spaced from the first tongue by long narrow arcuate portions, the amount of projection of the last tongue being small in relation to the length of the arcuate portions, and said arcuate portions being clear of the sides of the groove and guiding the rollers at an area removed from the outer peripheries of the rollers; substantially as described.

6. In an antifriction bearing, a race ring having a raceway and rolling elements running on the raceway, the race ring having a shallow groove near the end, a continuous, flat retaining and guiding ring for engagement with the rolling elements and having radially projecting tongues entering said shallow groove, one of the tongues being located wholly on one side of a diameter of the ring, another tongue being located wholly on the opposite side of said diameter and spaced from the first tongue by long narrow arcuate portions which are clear of the groove; substantially as described.

7. In an antifriction bearing, a race ring having a raceway and rolling elements running on the raceway, the race ring having a shallow groove near the end, a continuous, flat retaining and guiding ring for engagement with the rolling elements and having radially projecting tongues entering said shallow groove, one of the tongues being located wholly on one side of a diameter of the ring, another tongue being located wholly on the opposite side of said diameter and spaced from the first tongue by long narrow arcuate portions which are clear of the groove, and the amount of radial projection of said other tongue being small enough, in relation to the length of the arcuate portions, to allow its being sprung into the groove upon a temporary distortion of said long arcuate portions within the elastic limits of the ring material whereby the ring has inherent tendency to retain its flat guiding form without tendency to return to an intermediate form; substantially as described.

In testimony whereof I hereunto affix my signature.

HAROLD R. GIBBONS.